| United States Patent [19] | [11] Patent Number: 4,598,725 |
|---|---|
| Brewer | [45] Date of Patent: Jul. 8, 1986 |

[54] CONVERTIBLE PONCHO

[76] Inventor: Barney J. Brewer, 0483 Four O'Clock Rd., Breckenridge, Colo. 80424

[21] Appl. No.: 691,859

[22] Filed: Jan. 16, 1985

[51] Int. Cl.⁴ .................. E04H 15/30; A41D 3/08
[52] U.S. Cl. ..................................... 135/95; 135/88; 2/84; 2/89
[58] Field of Search ............... 135/95, 96, 117, 88, 135/89; 296/78.1, 136; 2/84, 88, 89

[56] References Cited

U.S. PATENT DOCUMENTS

| 364,762 | 6/1887 | King | 2/84 |
|---|---|---|---|
| 608,351 | 8/1898 | Terramorse | 135/95 |
| 719,899 | 2/1903 | Stacey | 135/95 |
| 1,193,443 | 8/1916 | Swan | 2/89 |
| 2,268,317 | 12/1941 | Till | 135/95 |
| 3,079,611 | 3/1963 | Boryszewski | 2/89 |
| 3,584,315 | 6/1971 | Hardy | 2/89 |
| 3,590,864 | 7/1971 | Jechesloff | 135/95 |
| 4,283,084 | 8/1981 | Gallagher | 296/78.1 |
| 4,356,831 | 11/1982 | Adams | 135/7 |

FOREIGN PATENT DOCUMENTS

| 179997 | 3/1954 | Austria | 276/78.1 |
|---|---|---|---|
| 18496 | 7/1956 | Fed. Rep. of Germany | 296/78.1 |
| 291975 | 7/1953 | Switzerland | 2/89 |
| 292628 | 8/1953 | Switzerland | 2/89 |
| 324376 | 9/1957 | Switzerland | 296/78.1 |

Primary Examiner—Robert A. Hafer
Assistant Examiner—R. J. Johnson
Attorney, Agent, or Firm—John E. Reilly

[57] ABSTRACT

A convertible poncho which may be adapted for use either as a protective covering for bicycles, motorcycles and the like, as a ground cover, or as protective rainwear for the rider. The cover is detachably secured to the bicycle by fastening means attached along the peripheral edges and to the interior faces of the cover. Additional fastening means are provided to detachably secure selected portions of the cover in a folding arrangement to adapt the cover for use as a poncho or as a ground cover. Apertures in the fore and aft portions of the covering are provided to allow a lock or cable to pass through the covering and capture a wheel of the vehicle. A detachable hood may be wrapped around the seat of the vehicle and secured by a drawstring or may be attached to the cover and adapted for use as a protective hood for the rider.

17 Claims, 7 Drawing Figures

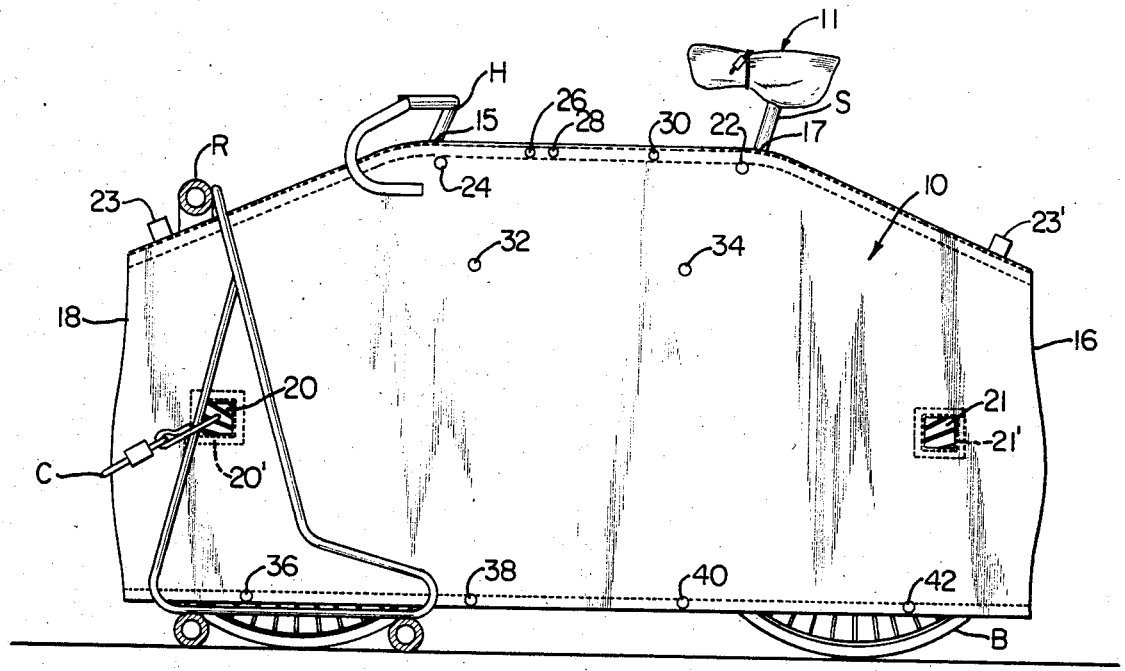
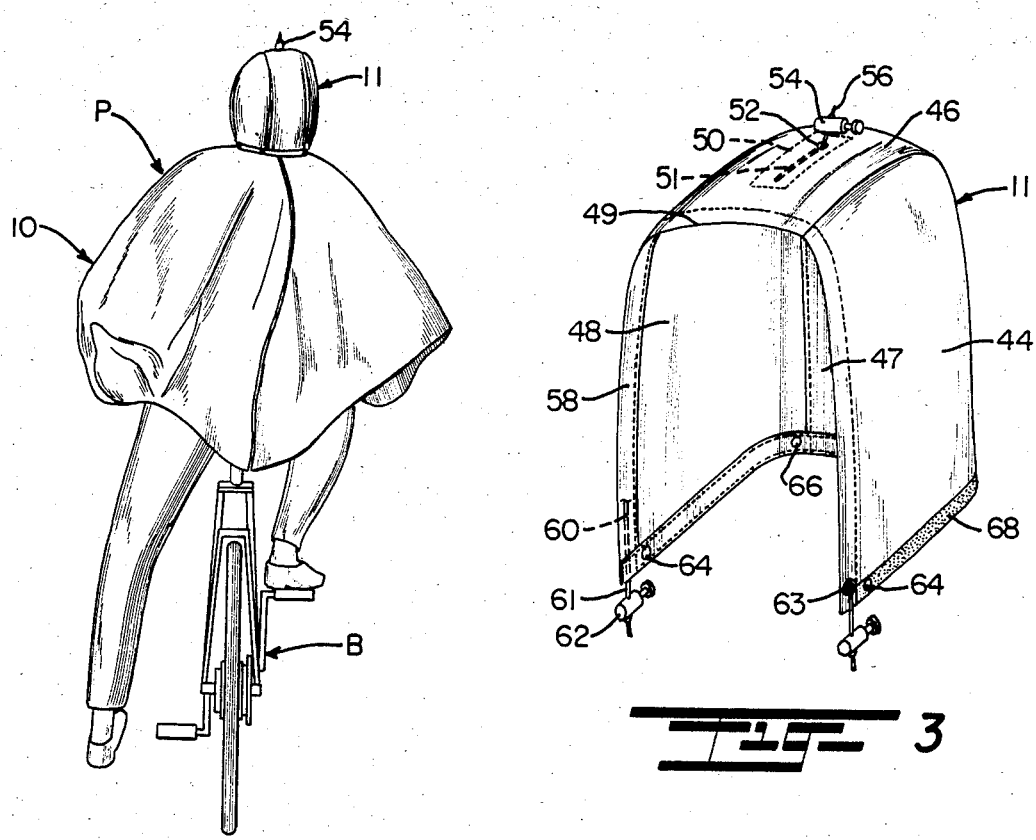

CONVERTIBLE PONCHO

SPECIFICATION

This invention relates generally to protective covers and, more particularly, to a lightweight, water-repellant poncho which is adapted for interchangeable use as a cover for bicycles, motorcycles and the like and as protective rain wear for the rider.

BACKGROUND AND FIELD OF THE INVENTION

Bicycle and motorcycle riders are often forced to leave their vehicles exposed to the elements either when traveling to a location without protective shelter or when living in a dwelling with inadequate indoor storage space. At least two undesirable results obtain from exposing the vehicle to the elements. First, the value of the vehicle is diminished due to corrosion of the finish and moving parts. Second, the rider is often faced with the discomfort of riding a vehicle having a wet seat and handlebars. The rider also experiences additional discomfort if he is forced to ride in inclement weather without any protective rain gear. Accordingly, there is a need for a protective cover which protects a bicycle, motorcycle or similar vehicle from exposure to the elements when stored outdoors and which may further be adapted for use by the rider as protective rain gear.

Bicycle and motorcycle covers which comprise large sheets of canvas or plastic-like materials are well-known in the art. Such coverings typically are not shaped to conform to the shape of the vehicle, but, rather, are attached by tightening drawstrings or fastening grommets. These coverings are generally difficult to handle and store because of their bulk.

Improvements in bicycle coverings have been proposed in the past to eliminate the aforementioned shortcomings. Representative of these are U.S. Pat. Nos. 4,283,084 to D. A. Gallagher and 4,356,831 to L. A. Adams. Both of these patents disclose coverings which are lightweight and portable. However, neither of these coverings serves the dual function of protective covering for a vehicle and rainwear for the rider. The concept of a covering which may be adapted to protect either a vehicle or its rider against inclement weather is broadly disclosed in Swiss Pat. Nos. 291,975 to Meylan and 292,628 to Wurtenburg. However, neither of the coverings shown in these patents discloses the unique fastening arrangement of the present invention.

SUMMARY OF THE INVENTION

It is therefore an object of the present invention to provide for a novel and improved protective cover which is adaptable for use in covering a vehicle, such as, a bicycle when not in use and includes means for converting the cover to a poncho to be worn by a person in riding the vehicle without interfering with the rider's mobility or the operation of the vehicle.

It is another object of the present invention to provide for a novel and improved water-repellant cover which is adapted for use as protective rain gear in riding or operating vehicles, such as, bicycles or motorcycles in a safe and dependable manner.

It is yet another object of the present invention to provide for a novel and improved water-repellant cover which may be adapted for use as a protective ground covering.

A further object of the present invention is to provide for a novel and improved cover which may be constructed of lightweight water-repellant materials and selectively fastened into different configurations so as to be conformable for a number of uses.

In accordance with a preferred form of the present invention, there is provided a convertible poncho comprising one or more sheets of flexible, water-resistant material defining opposite side panels, each panel having upper and lower peripheral edges and front and rear end portions. A lower releasable fastening means attached to the lower peripheral edge of the panels is attachable to complementary upper releasable fastening members at selected locations on interior portions of the panels to detachably secure front and rear portions of the panels in folded relation to one another in the form of a poncho. A limited opening formed at one intermediate portion of the upper peripheral edges is adapted to receive a hood member which is detachably secured to the poncho by attaching releasable fastening means along a lower peripheral edge of the hood member to complementary releasable fastening means attached to peripheral edges of the limited opening.

The convertible poncho of the present invention provides a water-repellant cover adapted for interchangeable use as a bicycle cover, ground cover and as a poncho. The cover is detachably secured in surrounding relation to the bicycle by fastening means attached along the peripheral edges and to the interior of the cover. Apertures in the fore and aft portions of the covering are provided for a lock or cable to pass through the covering and capture one or both wheels of the bicycle in locking it to a bicycle rack. As discussed above, additional fastening means are provided to detachably secure selected portions of the cover into a different configuration whereby to adapt the cover for use as a poncho. The detachable hood cover may be wrapped around the seat and secured by a drawstring, or it may be attached to the poncho and used as a protective hood for the rider.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a side view in elevation of a preferred form of the cover of the present invention mounted on a bicycle;

FIG. 2 is a rear view of a preferred form of the cover of the present invention adapted for use as a hooded poncho worn by a bicycle rider;

FIG. 3 is an enlarged perspective view of the preferred form of the poncho hood showing the drawstring and means for securing the hood to the poncho;

DETAILED DESCRIPTION OF THE PREFERRED EMBODIMENT

Figure 6:
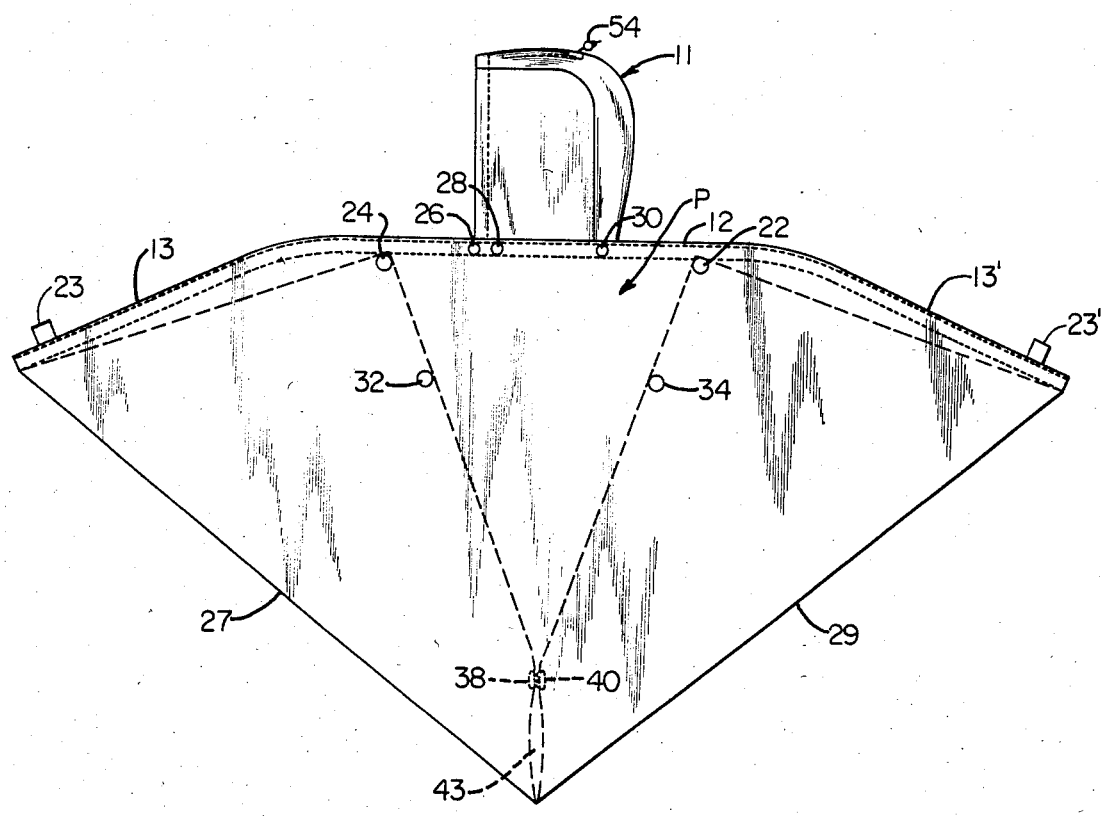
FIG. 6 is a side view of a preferred form of the cover with poncho hood attached and with sides of the cover folded and secured to adapt the cover for use as a poncho.
Figure 7:
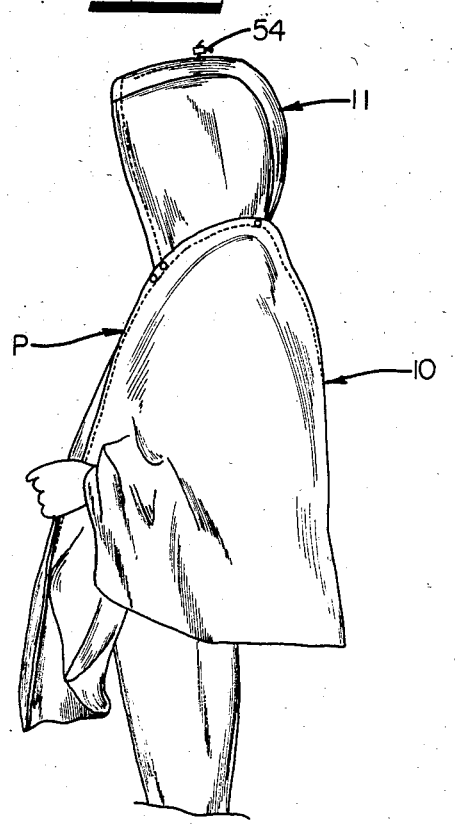
FIG. 7 is a side view of the preferred form of the cover adapted for use as a poncho and being worn by a bicycle rider.

Referring now to the drawings, reference numeral 10 refers generally to the protective cover of the present invention and 11 refers to a hood which is adaptable for use either as a seat cover or as a poncho hood. Occasional reference will be made to the combination of the cover 10 and hood 11 adapted for use as a poncho P, as shown in FIGS. 2, 6 and 7.

Figure 4:
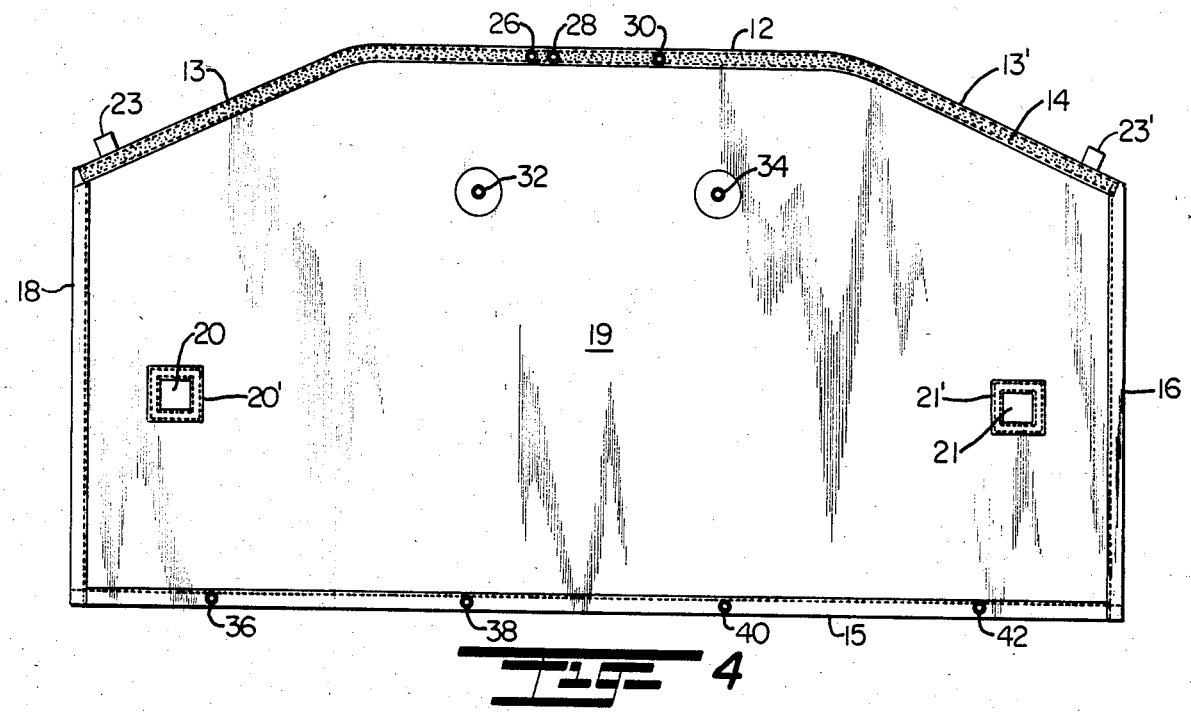
FIG. 4 is a side elevational view of the interior of one side panel of a preferred form of the cover.
Figure 5:
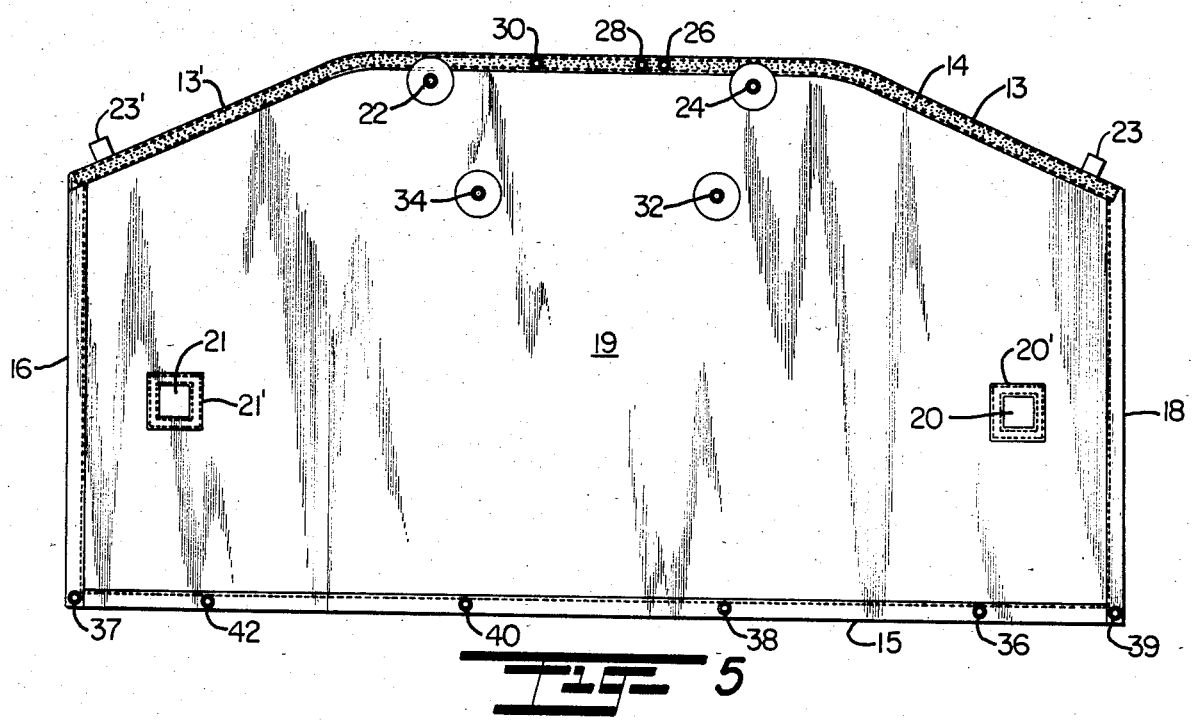
FIG. 5 is a side elevational view of the interior of the opposite side panel of a preferred form of the cover.

The overall shape of the preferred embodiment of the cover is generally rectangular in profile when mounted on a bicycle B as shown in FIG. 1. The cover is formed of two corresponding, generally symmetrical sheets or panels 19 of water-repellant material as shown in FIGS. 4 and 5, each panel having an elongated lower edge 15 and a top parallel edge 12 which verges into sloped forward and rearward upper edges 13 and 13', respectively. The latter edges 13 and 13' terminate in vertical front edge 18 and rear edge 16, respectively.

Preferably, the cover panels 19 are secured together along upper seams or edges 12, 13 and 13' by engaging strips 14 defined by hook and thistle fasteners, commonly referred to as VELCRO ®. The corresponding strips 14 on each of the panels are engaged to effect partial closure of the upper edges, while leaving gaps or openings 15 and 17 for upward extensions of the handlebar post H and seat post S, respectively, of a bicycle B. Tabs 23 and 23' are attached to forward and rearward upper edges 13 and 13', respectively, to aid in disengaging strips 14 to remove the cover from the vehicle.

Snap-type releasable connectors 26, 28 and 30 serve the dual function of providing additional support for the upper seam formed by engaging the strips of VELCRO ® 14 and for engaging complementary snap-type connectors on the hood 11 when the cover 10 and hood 11 are adapted for use as a poncho P, as described more fully hereinbelow.

The lower edges of the cover 10 are releasably connected by complementary male and female snap-type connectors 36, 38, 40 and 42 on each of the panels 19. As shown in FIG. 1, connectors 36 and 42 are positioned to capture the front and rear wheel, respectively, of a bicycle B, while connectors 38 are positioned immediately behind the front wheel and connectors 40 are positioned immediately in front of the rear wheel. Preferably, the front and rear edges 16 and 18 of the panels 19 are permanently fastened together, such as, by stitching, although it will be apparent that these edges may be releasably interconnected by VELCRO ® or other fasteners as well.

Each of the panels has a fore aperture 20 and aft aperture 21, at a location corresponding to the front and rear wheel, respectively, of a bicycle B. The edges of the apertures are reinforced with strips of material as at 20' and 21' to prevent ripping. A cable C or similar locking device may be received through the apertures to secure the bicycle B to a bicycle rack R.

The hood 11 is comprised of opposite side panels 44, 48 and top and rear panels 46 and 47, respectively, of a water-resistant material attached in an arrangement defining a covering with six faces, but with open faces corresponding to the front and bottom of the covering. As shown in FIG. 3, the left panel 48 and the right panel 44 of the covering are formed of generally square sheets of material, while the top panel 46 and rear panel 47 are formed from a single elongated, generally rectangular sheet of material folded along a transverse axis and attached along opposite side edges to left and right panels 48, 44.

A circumferential loop 58 of material is formed at the front edge 49 of the hood 11 to receive a first drawstring 60 having exposed ends 61 which may be drawn either to secure the hood 11 to the seat of a bicycle or to adjust its shape for use as a head covering. The ends 61 include grips 62, as shown in FIG. 3, disposed about either exposed end 61 of the drawstring 60 and slidably mounted to engage the drawstring 60 and retain it in the desired position. Reinforced apertures 63 at lower ends of the circumferential loop 58 are provided for receiving drawstring 60 and providing support for the grips 62 when the drawstring is adjusted.

A combination of VELCRO ® strips 68 and complementary snap-type connectors 64 and 66 are attached along the lower edges of the panels of the hood 11, as shown in FIG. 3, for use in securing the hood 11 to a bicycle seat or in attaching to the poncho P to adapt it for use as protective rainwear. A second drawstring 51 is attached along the centerline or longitudinal axis of the top panel 46 at a point proximate to the front edge 49 of the covering and extends rearwardly along the axis of the top panel 46. A rectangular panel 50 of material having a reinforced aperture 52 for receiving the second drawstring 51 is attached to the top panel 46, as shown in FIG. 3, to retain the second drawstring 51 in the desired position. A grip 54 disposed about the free end 56 of the second drawstring 51 is slidably mounted and may be used to engage second drawstring 51 to retain it in a desired position when adjusting the shape of the top panel 46 of the covering to conform to a bicycle seat or the head of the wearer.

The cover 10 is convertible for use as a poncho P by folding and detachably securing selected snap-type connectors on the panels 19 into a different fastening arrangement. As shown in FIG. 6, the front edge 18 and rear edge 16 of the cover 10 are drawn by reverse folding inwardly into the interior of the cover 10 and secured by engaging connectors 37 and 39 on the lower edge of one panel 19 with the connectors 22 and 24, respectively, located adjacent to the uppermost edge 12 of that panel. Connectors 42 and 36 along the lower edge 15 of each panel 19 are snapped together with connectors 34 and 32, respectively, in the interior portion of each panel. Apertures or sleeves 43 adaptable for receiving the rider's arms are formed on each side of the covering 10 by engaging connectors 38 and 40 along the bottom edge 15 of each panel. The resulting poncho P, as shown in FIG. 6, is generally diamond-shaped in profile, having the upper edge portions 12, 13 and 13' and lower edges 27 and 29 converging upwardly and away from the sleeves 43 into the front and rear edges of the portions 13 and 13'.

The hood 11 is secured to the poncho P by engaging the connectors 64 and 66 on the lower edges of the left and rights panels 48 and 44 of the hood 11 with corresponding connectors 28 and 30 on each of the top edges 12 of panels 19 of the poncho P as shown in FIG. 6. A seam between the poncho P and the hood 11 is defined by engaging VELCRO ® strip 68 along the lower edge of the hood 11 with selected portions of VELCRO ® strips 14 on each of the panels. The upper seam of the poncho 11 is completed by engaging VELCRO ® strips 14 along the upper edges 12, 13 and 13' of the panels while maintaining an aperture defined by the intersection of the bottom edge of the hood 11 with the upper edge of the poncho P, as described hereinabove.

The shape of the hood 11 may be changed by adjusting the first drawstring 60 carried in circumferential loop 58 along the front edge 49 of the hood and the second drawstring 51 attached to the top panel 46.

Another feature of the present invention which enhances its utility is the ability to convert it for use as a ground cover. The cover 10 may be adapted to this use by securing VELCRO ® strips 14 along the upper edges 12, 13 and 13' of panels 19 and engaging connectors 36, 38, 40 and 42 along the lower edges 15 of panels 19, thereby maintaining the covering in a generally rectangular profile. The resulting covering is suitable for use with various items of camping equipment, such as, tents and sleeping bags.

It can therefore be appreciated that this novel invention is fully capable of serving multiple functions as a protective covering for a bicycle, motorcycle or similar wheeled vehicle, protective rainwear for the rider and as a ground covering, thereby giving the user the convenience of several different functions embodied in a single item.

Although the present invention has been described with a certain degree of particularity, it is understood that the present disclosure has been made by way of example and that changes in the details of structure may be made without departing from the spirit and scope thereof.

I claim:

1. A convertible poncho comprising:
at least one sheet of flexible, water-resistant material defining opposite side panels including upper and lower peripheral edges, lower releasable fastening means along said lower peripheral edges and upper complementary releasable fastening members at selected locations on interior portions of said panels, a limited opening formed at an intermediate portion of said upper peripheral edge, said lower releasable fastening means on said lower peripheral edges attachable to said upper complementary releasable fastening members on said interior portions of said panels whereby to detachably secure front and rear portions of said panels in folded relation to one another in the form of a poncho, said lower releasably fastening means including a pair of spaced fasteners along said lower peripheral edge of each panel attachable together to define a sleeve.

2. A poncho according to claim 1, said lower releasable fastening means and upper complementary releasable fastening members defined by snap-type connectors.

3. A poncho according to claim 1, each panel further comprising fore and aft apertures and locking means insertable through said apertures.

4. A poncho according to claim 3, wherein said apertures comprise a pair of mutually spaced reinforced openings formed in each of said panels with opposite openings in registration with each other so that a locking member may pass through opposite openings.

5. A convertible poncho, comprising:
a pair of symmetrical panels of flexible, water-resistant material, said panels each of generally rectangular configuration having upper and lower peripheral edges and front and rear vertical peripheral edges, first releasable fastening means including fastening members along said lower peripheral edges and at selected locations on interior portions of said panels, said upper peripheral edges having second releasable fastening means including fastening members for securing said upper peripheral edges together with a limited opening formed at an intermediate portion of said upper peripheral edges, selected members of said first releasable fastening means on said lower peripheral edges attachable to selected of said fastening members on said interior portions of said panels whereby to detachably secure front and rear portions of said panels in folded relation to one another in the form of a poncho, of generally triangular configuration with downwardly convergent front and rear edges a hood member having at least one peripheral edge including fastening means attachable to selected members of said second releasably fastening means on opposing faces of said limited opening formed at an intermediate portion of said upper peripheral edges.

6. A convertible poncho according to claim 5, said panels permanently attached along common front and rear vertical peripheral edges.

7. A convertible poncho according to claim 6, said first releasable fastening means defined by snap-type connectors and said second releasable fastening means defined by strips of hook and thistle fastening material.

8. A convertible poncho according to claim 5, said first releasable fastening means including a pair of spaced fasteners along said lower peripheral edge of each panel attachable together to define a sleeve.

9. A convertible poncho according to claim 8, each panel further comprising fore and aft apertures, and locking means insertable through said apertures.

10. A convertible poncho according to claim 9, wherein said apertures comprise a pair of mutually spaced, reinforced openings formed in each of said panels with opposite openings in registration with each other so that a locking means may pass through opposite aligned openings.

11. A convertible poncho according to claim 5, said hood member comprising opposite side panels and a center panel therebetween folded along a transverse axis to define a top and a rear L-shaped panel, said L-shaped panel attached between said side panels to define a hood member having a front open face and bottom open face corresponding to the front and bottom of said hood member.

12. A convertible poncho according to claim 11, said hood member further comprising first drawstring means carried by front edges of said top and side panels immediately adjacent to said front open face and second drawstring means carried by said top panel.

13. A convertible poncho according to claim 12, wherein said first drawstring means includes a circumferential loop of said material formed at the front edge of said center and side panels, reinforced apertures at either end of said loop, a first drawstring received in said loop and said apertures, and slidably mounted gripping means disposed about either end of said first drawstring.

14. A convertible poncho according to claim 13, wherein said second drawstring means includes a drawstring attached along the centerline longitudinal axis of said center panel at a point proximate to the front edge of said panel with a second drawstring extending rearwardly from said front edge, a rectangular panel having an aperture for receiving said second drawstring with said second drawstring extending therethrough, said center panel being adapted for retaining said second drawstring between said rectangular sheet and said panel with said aperture being on the distal end of said rectangular panel in relation to the point of attachment of said second drawstring, and slidably mounted gripping means disposed about the free end of said second drawstring.

15. A convertible poncho according to claim 14, said hood member including a combination of hook and thistle-type and snap-type fastening means attached to lower peripheral edges of said side and rear panels, selected members of said combination of fastening means attachable to complementary members of fastening means attached to peripheral edges of said limited opening.

16. A convertible poncho according to claim 15, wherein said panels are constructed of heavy gauge weatherproof material.

17. A convertible poncho according to claim 16, wherein said material is plastic.

* * * * *